Aug. 2, 1966 J. L. WISE 3,264,036
WHEEL COVER ASSEMBLY
Filed Oct. 5, 1964 2 Sheets-Sheet 2
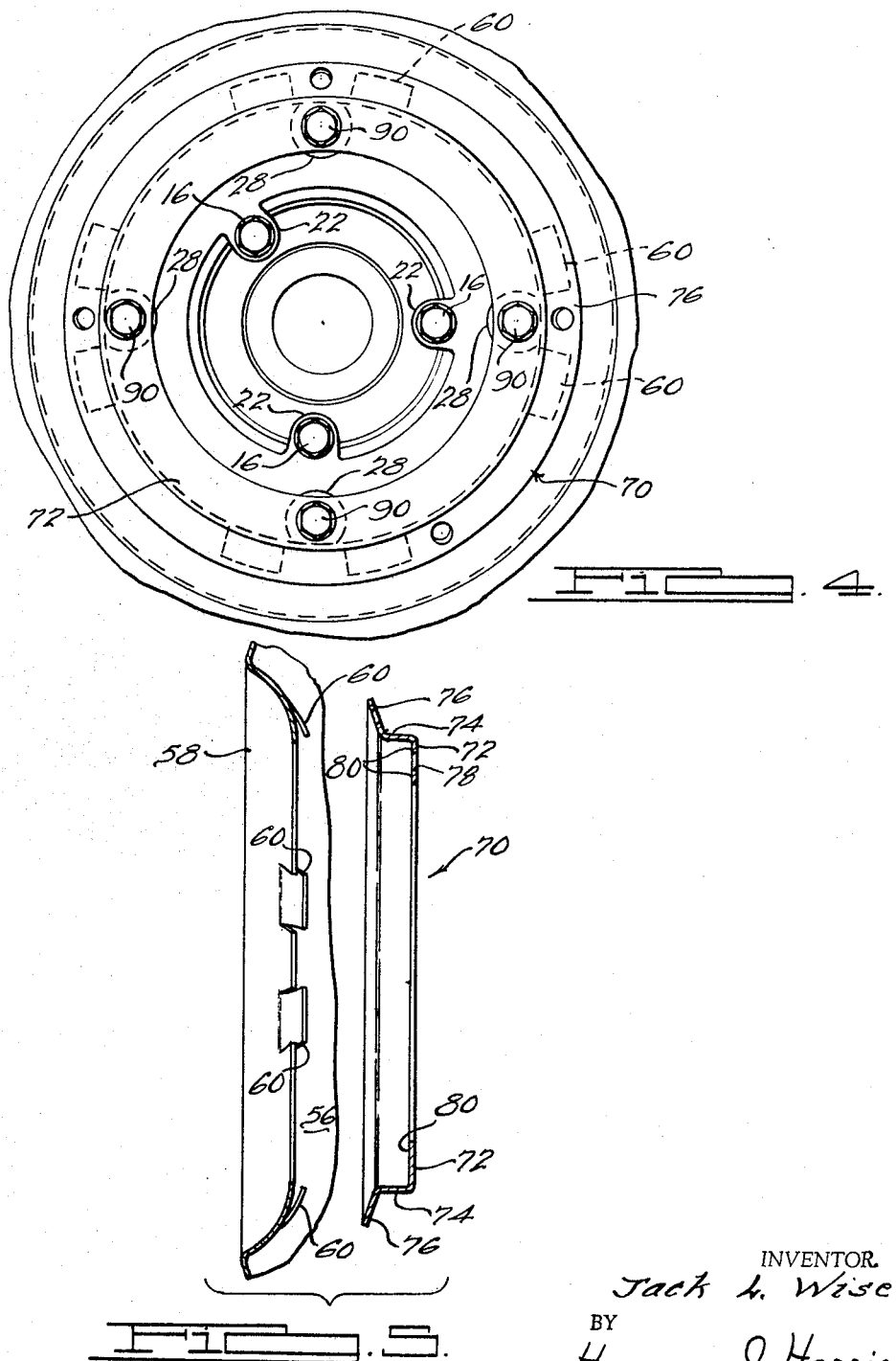
INVENTOR.
Jack L. Wise
BY
Harness and Harris
ATTORNEYS.

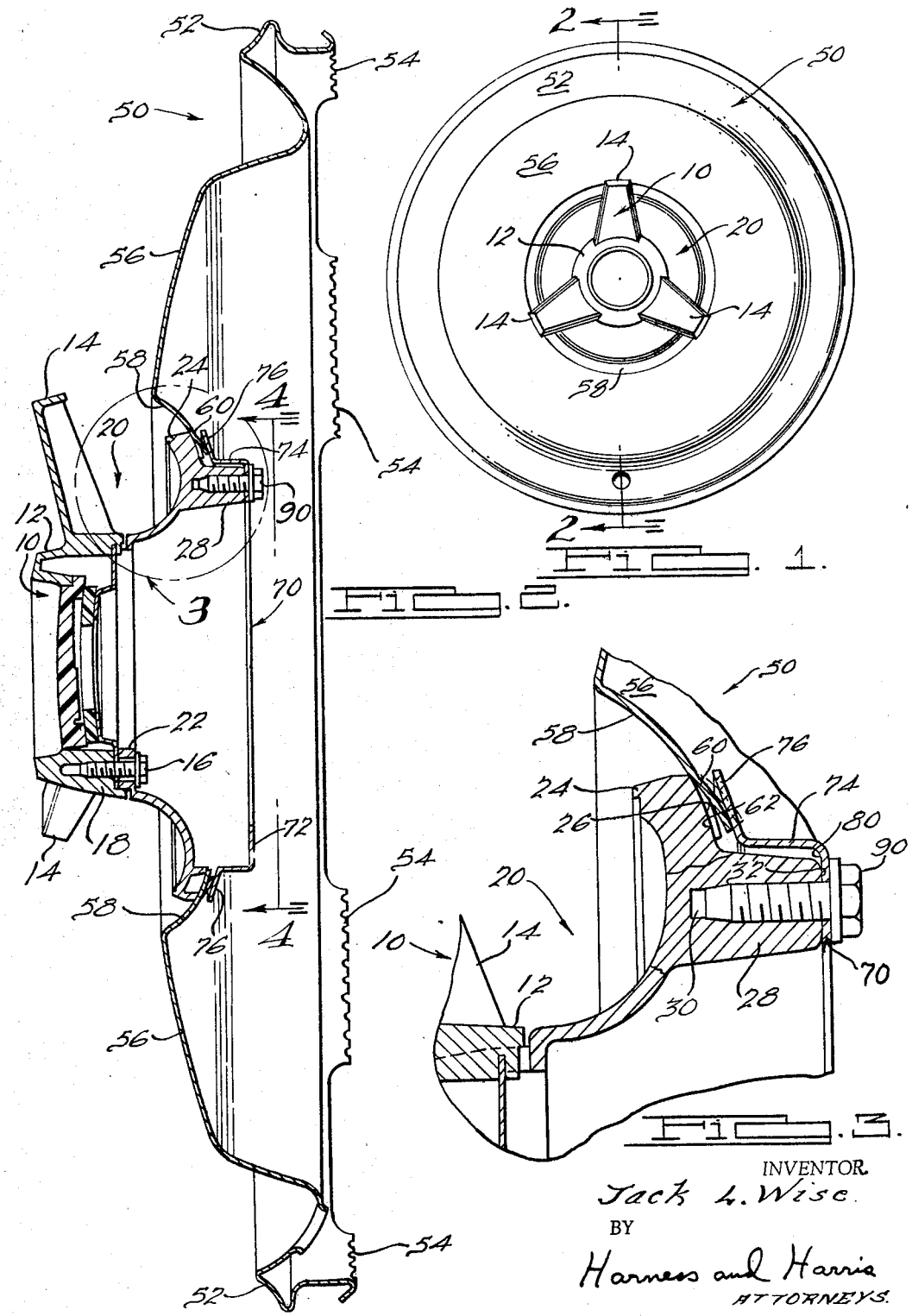

United States Patent Office 3,264,036
Patented August 2, 1966

3,264,036
WHEEL COVER ASSEMBLY
Jack L. Wise, Rochester, Mich., assignor to Chrysler Corporation, Highland Park, Mich., a corporation of Delaware
Filed Oct. 5, 1964, Ser. No. 401,536
7 Claims. (Cl. 301—37)

This invention relates to a wheel cover and more particularly to wheel covers of the type comprising two or more annular or disk shaped members adapted to be secured together in concentric relationship to form a wheel cover assembly.

It is an object of the present invention to provide, in a wheel cover assembly, a novel arrangement whereby the various annular members may be held together in non-rattling relationship.

It is a more specific object to provide, in a wheel cover assembly, a novel arrangement whereby the various annular members may be held together in non-rattling relationship by means which are not visible at the outer face of the assembly and hence do not detract from the appearance of the assembly.

Another object is to provide, in a wheel cover assembly, a novel arrangement whereby the various annular members may be securely held together while yet maintaining certain delicate exterior dimensions desirable for styling considerations.

These and other objects, features, and advantages of the invention will be apparent from the following detailed description of a preferred embodiment of the invention, and from the accompanying drawings in which:

FIGURE 1 is a front view of a wheel cover assembly embodying the invention;

FIGURE 2 is an enlarged cross-sectional view taken on line 2—2 of FIGURE 1;

FIGURE 3 is a further enlarged view of the circled portion of the wheel cover assembly of FIGURE 2;

FIGURE 4 is a view taken on line 4—4 of FIGURE 2; and

FIGURE 5 is a fragmentary exploded view showing the constructional details of, and the coaction between, two of the parts of the wheel cover assembly of the invention.

The wheel cover assembly of the illustrated embodiment of the invention comprises, broadly, a spinner 10, a dome 20 and a cover ring 50. The spinner 10 and dome 20 are preferably formed as zinc die castings and cover ring 50 as a stainless steel stamping.

Cover ring 50, as best seen in FIGURE 2, includes a rim portion 52 provided with the usual serrated portions 54 for engagement with the wheel rim, a body portion 56, a dished inner portion 58.

Dome 20 is generally ring shaped and includes a plurality of bosses 22 (see also FIGURE 4) projecting radially inwardly from its inner rim.

Spinner 10 includes a hub portion 12 and a plurality of arms 14 (see also FIGURE 1) radiating from hub portion 12.

Spinner 10 is secured centrally to dome 20 by a plurality of self-tapping screws 16 passing through holes provided in bosses 22 and into blind bores provided in lugs 18 cast integral with spinner hub portion 12.

The invention concerns primarily the manner in which the dome and spinner subassembly is secured to the cover ring 50 to form the complete wheel cover assembly. As best seen in FIGURE 3, dome 20 includes an outer rim portion 24 presenting at its inner (or righthand as viewed in FIGURE 3) face an annular contact surface 26. A plurality of circumferentially spaced lugs 28, cast integral with dome 20, extend axially inwardly from the inner face of rim portion 24. Lugs 28 lie on a lug circle which is concentric with, and within, annular contact surface 26. Each lug has a central blind bore 30 opening at the free end of the lug.

Dished portion 58 of cover ring 50 has an inner diameter somewhat less than the outer diameter of dome 20 so as to provide radial overlap therebetween. The inner periphery of dished portion 58 is lanced at circumferentially spaced locations to provide a plurality of circumferentially spaced prongs 60 (see also FIGURE 5). Prongs 60 are permanently bent axially inwardly, out of the general plane of dished portion 58, so that the free ends of the prongs, in their relaxed condition, are spaced axially inwardly of the inner face of the main body portion of dished portion 58.

A retainer ring 70 is provided for coaction with prongs 60. Retainer ring 70, as best seen in FIGURE 5, includes an annular main body portion 72 and a rim portion 74 projecting axially outwardly from main body portion 72 and terminating in a radially flaring lip portion 76. Main body portion 72 is provided with a plurality of apertures 78 corresponding in number and circumferential positioning to the lugs 28.

In the assembly of the wheel cover, the dome and spinner subassembly are positioned centrally within the cover ring so that the annular contact surface 26 on rim portion 24 is positioned against a mating annular contact surface 62 presented by the axial outer face of dished portion 58 adjacent the inner periphery of the latter. Retainer ring 70 is then centrally positioned over lugs 28 to position its flaring lip portion 76 against the free ends of prongs 60.

Self-tapping screws 90 are then passed through the apertures 78 in ring 70 for threaded engagement with the blind bores 30 in lugs 28. As the screws are threaded into the lugs, the heads of the screws engage the retainer ring so that further threading of the screws draws the retainer ring axially outwardly to compress prongs 60 between lip portion 76 and dome 20 and thereby press annular contact surfaces 26 and 62 together in non-rattling relationship.

Further threading of screws 90 increases the compression of prongs 60 and presses an annular contact surface 80 presented by the axially outer face of main body portion 72 against a mounting surface 32 provided by the free ends of lugs 28. The initial or relaxed position of prongs 60 is shown in phantom in FIGURE 3 and the final compressed position is shown by the solid line prong position of that figure.

This arrangement enables the dome and cover ring to be securely and simply assembled and yet maintains a relatively thin dimension, desirable for styling considerations, at the outer peripheral edge of rim portion 24. It will also be apparent that the resiliency or give provided by prongs 60 enables dome 20 and cover ring 50 to be assembled tightly together despite undesired, but sometimes uncontrollable, variations in the height or effective axial extent of rim portion 74 relative to the height or effective axial extent of lugs 28.

While a preferred embodiment of the invention has been illustrated and described, it will be apparent that various changes may be made without departing from the scope or spirit of the invention as defined by the appended claims.

I claim:
1. A wheel cover assembly comprising:
(A) a first generally circular member having
(1) an axially inner face presenting a generally annular contact surface and
(2) means projecting axially inwardly from said inner face to define a mounting surface spaced inwardly from said face;

(B) a second generally circular member of resilient material including
  (1) an annular main body portion having an axially outer face presenting a generally annular contact surface for mating coaction with the annular surface on said first member, and
  (2) at least one prong portion integral with said main body portion and having its free end disposed, in relaxed condition, axially inwardly of the inner face of said main body portion;
(C) a third generally circular member including
  (1) an annular main body portion having
    (a) an axially outer face presenting an annular surface adapted to be pressed against said mounting surface, and
    (b) an aperture passing axially therethrough, and
  (2) a rim portion projecting axially outwardly from the main body portion of said third member; and
(D) at least one headed fastener member having a shaft portion adapted to be passed through said aperture and outwardly into said projecting means on said first member to engage said head with said third member adjacent said aperture and draw said third member outwardly, whereby to press the annular surface on said third member against said mounting surface and press said rim portion against said prong to press said annular contact surfaces yieldably together in non-rattling relationship.

2. A wheel cover assembly according to claim 1, wherein the aforesaid annular contact surface on said first member is adjacent the peripheral outer edge of that member and said projecting means are spaced radially inwardly from said peripheral outer edge.

3. A wheel cover assembly comprising:
(A) a first generally circular member having
  (1) an axially inner face presenting a generally annular contact surface, and
  (2) at least two lugs projecting axially inwardly from said inner face at spaced locations thereon;
(B) a second generally circular member of resilient material including
  (1) an annular main body portion having an axially outer face presenting a generally annular contact surface for mating coaction with the annular surface on said first member, and
  (2) at least one prong portion integral with said main body portion and having its free end disposed, in relaxed condition, axially inwardly of the inner face of said main body portion;
(C) a third generally circular member including
  (1) an annular main body portion having
    (a) an axially outer face presenting an annular surface adapted to be pressed against said lugs, and
    (b) apertures passing axially therethrough, and
  (2) a rim portion projecting axially outwardly from the main body portion of said third member; and
(D) at least two headed screws each having a shaft portion adapted to be passed through a respective aperture and outwardly into a respective lug to engage at its head with said third member adjacent that aperture and draw said third member outwardly, whereby to press the annular surface on said third member against said lugs and press said rim portion against said at least one prong to press said annular contact surfaces yieldably together.

4. A wheel cover assembly according to claim 3, wherein
(A) each said lug is provided with a blind axial bore opening at the free end thereof; and
(B) said screws are self-tapping.

5. A wheel cover assembly comprising:
(A) a first generally circular member having
  (1) an axial inner face presenting a generally annular contact surface and
  (2) means projecting inwardly from said inner face to define a mounting surface spaced inwardly from said face;
(B) a ring member lanced at spaced locations around its inner periphery to provide a plurality of prongs
  (1) said prongs being bent axially inwardly out of the general plane of said ring member;
(C) a second generally circular member including
  (1) an annular main body portion having
    (a) an axially outer face presenting an annular surface adapted to be pressed against said mounting surface and
    (b) an aperture passing axially therethrough, and
  (2) a rim portion projecting axially outwardly from the main body portion of said second member; and
(D) at least one fastener member having a shaft portion adapted to be passed through said aperture and outwardly into said projecting means on said first member to engage at its head with said second member adjacent said aperture and draw said second member outwardly, whereby to press the annular surface on said second member against said mounting surface and press said rim portion against said prong to press said ring member yieldably against said annular contact surface.

6. A wheel cover assembly comprising:
(A) a first generally circular member having
  (1) an axially inner face presenting a generally annular contact surface adjacent the outer peripheral edge of said member and
  (2) a plurality of lugs extending axially inwardly from the inner face of said member and lying on a lug circle concentric with, and within, said annular contact surface;
(B) a ring member having an inner diameter somewhat less than the outer diameter of said first member and presenting at its axially outer face, adjacent its inner periphery, an annular contact surface for coaction with the annular contact surface on said first member
  (1) said ring member being lanced at spaced locations around its inner periphery to provide a plurality of prongs and
  (2) said prongs being bent axially inwardly out of the general plane of said ring member;
(C) a second generally circular member including
  (1) an annular main body portion having
    (a) an axially outer face presenting an annular surface adapted to be pressed against said lugs and
    (b) a plurality of apertures passing axially therethrough;
  (2) a rim portion projecting axially outwardly from the axially outer face of the main body portion of said second member; and
(D) a plurality of headed fastener members each having a shaft portion adapted to be passed through a respective aperture and outwardly into a respective lug to engage at its head with said second member adjacent that aperture and draw said second member outwardly, whereby to press the annular surface on said second member against said lugs and press said rim portion against said prongs to press said annular contact surfaces together in non-rattling relationship.

7. A wheel cover assembly according to claim 6, wherein said first member comprises a die casting of a soft metallic material and said ring member comprises a stainless steel stamping.

(References on following page)

References Cited by the Examiner

UNITED STATES PATENTS

| | | | |
|---|---|---|---|
| 2,698,768 | 1/1955 | McLeod | 301—37 |
| 3,078,124 | 2/1963 | Mulder | 301—37 |
| 3,145,062 | 8/1964 | Judd | 301—37 |
| 3,174,803 | 3/1965 | Mulhern | 301—37 |

BENJAMIN HERSH, *Primary Examiner.*

R. J. JOHNSON, *Assistant Examiner.*